United States Patent Office 3,245,975
Patented Apr. 12, 1966

3,245,975
PROCESS FOR PRODUCTION OF RUBBERY
POLYMERS
Robert P. Zelinski, Bartlesville, Okla., assignor to Phillips
Petroleum Company, a corporation of Delaware
No Drawing. Filed Oct. 6, 1959, Ser. No. 844,651
10 Claims. (Cl. 260—94.3)

This invention relates to a process for polymerizing 1,3-butadiene so as to obtain a rubbery polymer. In one aspect, the invention relates to a process for producing cis 1,4-polybutadiene and a novel catalyst system therefor.

Numerous methods have been advanced for the polymerization of 1,3-butadiene, including emulsion polymerization, alkali metal-catalyzed polymerization, and alfin-catalyzed polymerization. In the emulsion polymerization of butadiene, a polymer is obtained which has from 60 to about 80 percent trans 1,4-addition, from about 5 to about 20 percent cis 1,4-addition, and from about 15 to about 20 percent 1,2 - addition. Sodium - catalyzed polybutadiene has been found to contain from about 60 to about 75 percent 1,2-addition, the remainder being cis and trans 1,4-addition. The utilization of potassium and other alkali metals as catalysts may cause the latter ratios to vary to some degree. A polybutadiene produced with an alfin-catalyzed polymerization has from about 65 to about 75 percent trans 1,4-addition, from about 5 to about 10 percent cis 1,4-addition and from about 20 to about 25 percent 1,2-addition. Until quite recently it seems that no polymer of butadiene had been produced which contained more than about 35 percent cis 1,4-configuration. When a catalyst consisting of a trialkylaluminum and titanium tetrachloride or titanium tetrabromide is utilized in the polymerization of butadiene, the resulting polymer product contains generally between 30 and 70 percent cis 1,4-addition. However, it has now been discovered that when a catalyst comprising certain organometals and titanium tetraiodide is employed, a polybutadiene containing 90 percent and higher cis 1,4-addition can be produced. In accordance with the present invention, a novel catalyst system is provided which employs titanium tetrachloride or titanium tetrabromide rather than titanium tetraiodide and which has been still found to be effective for use in preparing a polybutadiene of very high cis 1,4- content.

It is an object of this invention to provide a novel process for producing a rubbery polymer of 1,3-butadiene.

Another object of the invention is to provide a process for polymerizing 1,3-butadiene in which the rubbery polymer product produced contains a high percentage of cis 1,4-addition.

A further object of the invention is to provide a novel catalyst system for use in the preparation of a polybutadiene of high cis 1,4-content.

Other and further objects and advantages of the invention will become apparent to those skilled in the art upon consideration of the accompanying disclosure.

Broadly speaking, the process of this invention comprises contacting 1,3-butadiene with a catalyst comprising (a) an organometal compound corresponding to the formula $R_3Al$, wherein R is an alkyl radical containing from 1 to 12, inclusive, carbon atoms, (b) a titanium halide corresponding to the formula $TiX_m$, wherein X is chlorine or bromine and $m$ is an integer from 2 to 4, inclusive, and (c) iodine. As mentioned hereinbefore, a polybutadiene having a very high percentage of cis 1,4-addition can be prepared by polymerizing 1,3-butadiene in the presence of a catalyst comprising an organometal and titanium tetraiodide. Also, when titanium tetrachloride or titanium tetrabromide is used instead of titanium tetraiodide in such a system, the polybutadiene generally contains between 30 and 70 percent cis 1,4-addition. It was completely unexpected, therefore, when it was found that a polybutadiene having a configuration similar to that produced with an organometal-titanium tetraiodide catalyst system could be produced with an organometal-titanium chloride or bromide system to which iodine had been added. Of the various materials employed in these catalyst systems, the titanium tetraiodide is by far the most expensive. Accordingly, the cost of catalyst per pound of polymer is substantially decreased when utilizing the present catalyst system rather than the organometal-titanium tetraiodide catalyst. In a commercial operation, the cost of the catalyst is, of course, a very important factor. Another of the advantages in utilizing the present catalyst system is that the catalyst components are soluble in hydrocarbons, thereby facilitating the charging of the catalyst ingredients during conduct of the process. When employing the organometal-titanium tetraiodide catalyst system, it is usually desired to operate at comparatively low temperatures, e.g., at about 30° C. and lower, when producing polymers having an extremely high cis 1,4-content. Another of the advantages of the present catalyst system relates to the fact that the combination of the catalyst components permits operation at a higher temperature than can be used with the catalyst containing titanium tetraiodide without causing any appreciable loss in the cis-content of the product.

The alkyl groups in the $R_3Al$ compounds can be either straight or branched chain alkyls, e.g., methyl, ethyl, propyl, isopropyl, n-butyl, isobutyl, pentyl, isohexyl, n-heptyl, n-octyl, or tert-dodecyl. Examples of such organometal compounds which can be employed in the present process include trimethylaluminum, triethylaluminum, triisobutylaluminum, tri-n-pentylaluminum, triisooctylaluminum, tri-n-dodecylaluminum, and the like. It is to be understood also that the alkyl groups of the organometal compounds need not be alike, compounds such as methyldiethylaluminum and dimethylethylaluminum being applicable for use in the present catalyst system.

The titanium halides utilized in the catalyst system of this invention are the di-, tri-, and tetrachlorides of titanium, and the di-, tri-, and tetrabromides of titanium. It is usually preferred to use titanium tetrachloride or titanium tetrabrodime as the catalyst components.

Examples of specific catalyst systems which can be employed in the practice of this invention include the following: triethylaluminum, titanium tetrachloride, and iodine; triisobutylaluminum, titanium trichloride, and iodine; tri-n-pentylaluminum, titanium tetrabromide, and iodine; triisooctylaluminum, titanium dichloride, and iodine; tri-n-dodecylaluminum, titanium tetrachloride, and iodine.

The mol ratio of the organometal compound to the titanium halide is in the range of 2:1 to 20:1, with a range of 3 to 8 mols of the organometal compound to 1 mol of the titanium halide being preferred. The mol ratio of the titanium halide to iodine is in the range of 10:1 to 0.25:1, with a range of 3:1 to 0.25:1 being preferred. In all cases an excess of the organometal compound must be employed, i.e., the mol ratio of the organometal compound to the total molar quantities of titanium halide and iodine is greater than 1. The catalyst level is in the range of 1 to 20 gram millimoles of the organometal compound per 100 grams of 1,3-butadiene to be polymerized. The actual catalyst level employed will, in general, be determined by the molecular weight of the product which is desired.

The polymerization process of this invention is usually carried out in the presence of a diluent. Diluents suitable for use in the process are hydrocarbons which are substantially inert and non-detrimental to the polymerization reaction. Suitable diluents include aromatics, such as benzene, toluene, xylene, ethylbenzene and mixtures thereof. It is also within the scope of the invention to use straight and branched chain paraffins which contain up to and including 10 carbon atoms per molecule. Examples of paraffins which can be utilized include propane, normal butane, normal pentane, isopentane, normal hexane, isohexane, 2,2,4-trimethylpentane (isooctane), normal decane, and the like. Mixtures of these paraffinic hydrocarbons can also be employed as diluents in carrying out the process of this invention. Cycloparaffins, such as cyclohexane and methylcyclohexane, can also be used. Furthermore, mixtures of any of the aforementioned hydrocarbons can be used as diluents. It is usually preferred to carry out the polymerization in the presence of an aromatic hydrocarbon since polymers having the highest cis contents are produced when operating in this manner.

The polymerization process of this invention can be carried out at temperatures varying over a rather wide range, e.g., from −100 to 250° F. It is usually preferred to operate at a temperature in the range of −30 to 160° F. The polymerization reaction can be carried out under autogenous conditions or any suitable pressure sufficient to maintain the reaction mixture substantially in the liquid phase. The pressure will thus depend upon the particular diluent being employed and the temperature at which the polymerization is carried out. However, higher pressures can be employed if desired, these pressures being obtained by some such suitable method as the pressurization of the reactor with a gas which is inert with respect to the polymerization reaction. It is to be understood also that it is within the scope of the invention to conduct the polymerization in the solid phase.

The process of this invention can be carried out as a batch process by charging 1,3-butadiene into a reactor containing catalyst and diluent. Although any suitable charging procedure can be used, it is usually preferred to add the catalyst components to a reactor containing diluent and thereafter introducing the 1,3-butadiene. The iodine can be added to the reactor separately, or it can be added mixed with one or the other of the catalyst components. It is also within the scope of the invention to preform the catalyst by reacting the catalyst components within a separate catalyst preparation vessel. The resulting reaction product can then be charged to the reactor containing monomer and diluent, or these latter materials can be added after the catalyst. The process can also be carried out continuously by maintaining the above-mentioned concentrations of reactants in the reactor for a suitable residence time. The residence time in a continuous process will, of course, vary within rather wide limits, depending upon such variables as temperature, pressure, the ratio of catalyst components and the catalyst concentrations. In a continuous process, the residence time will usually fall within the range of 1 second to 1 hour when conditions within the specified ranges are employed. When a batch process is being utilized, the time for the reaction can be as high as 24 hours or more.

Various materials are known to be detrimental to the catalyst composition of this invention. These materials include carbon dioxide, oxygen and water. It is usually desirable, therefore, that the butadiene be freed of these materials as well as other materials which may tend to inactivate the catalyst. Any of the known means for removing such contaminants can be used. Furthermore, when a diluent employed in the process, it is preferred that this material be substantially freed of impurities such as water, oxygen, and the like. In this connection, it is desirable to remove air and moisture from the reaction vessel in which the polymerization is to be conducted. Although it is preferred to carry out the polymerization under anhydrous or substantially anhydrous conditions, it is to be understood that some small amounts of these catalyst-inactivating materials can be tolerated in the reaction mixture. However, it is also to be understood that the amount of such materials which can be tolerated is insufficient to cause complete deactivation of the catalyst.

At the completion of the polymerization reaction, when a batch process is used, the total reaction mixture is then treated to inactivate the catalyst and recover the rubbery product. Any suitable method can be utilized in carrying out this treatment of the reaction mixture. In one method, the polymer is recovered by steam stripping the diluent from the polymer. In another suitable method, a catalyst-inactivating material, such as an alcohol, is added to the mixture so as to inactivate the catalyst and cause precipitation of the polymer. The polymer is then separated from the alcohol and diluent by any suitable method, such as decantation or filtration. It is often preferred to add initially only an amount of the catalyst-inactivating material which is sufficient to inactivate the catalyst without causing precipitation of the dissolved polymer. It has also been found to be advantageous to add an antioxidant, such as phenyl-beta-naphthylamine, to the polymer solution prior to the recovery of the polymer. After addition of the catalyst-inactivating material and the antioxidant, the polymer present in the solution can then be separated by the addition of an excess of material such as ethyl alcohol or isopropyl alcohol. When the process is carried out continuously, the total effluent from the reactor can be pumped from the reactor to a catalyst-inactivating zone wherein the reactor effluent is contacted with a suitable catalyst-inactivating material, such as an alcohol. When an alcohol is used as a catalyst-inactivating material, it also functions to precipitate the polymer. In the event catalyst-inactivating materials are employed which do not perform this dual role, a suitable material, such as an alcohol, can then be added to precipitate the polymer. It is, of course, to be realized that it is within the scope of the invention to employ other suitable means to recover the polymer from solution. After separation from the water or alcohol and diluent by filtration or other suitable means, the polymer is then dried.

The polymers produced in accordance with this invention are rubbery polymers. The polymers can be compounded by the various methods such as have been used in the past for compounding natural and synthetic rubbers. Vulcanization accelerators, vulcanizing agents, reinforcing agents, and fillers such as have been employed in natural rubber can likewise be used when compounding the rubber of this invention.

It is also within the scope of the invention to blend the polymers with other polymeric materials such as natural rubber, cis 1,4-polyisoprene, polyethylene, and the like. As mentioned hereinbefore, the polymers of this invention have a high cis-content which renders them very suitable for applications requiring low hysteresis, high resiliency, and low freeze point. In general, the polymers have utility in applications where natural and synthetic rubbers are used. They are particularly useful in the manufacture of automobile and truck tires and other rubbery articles, such as gaskets.

A more comprehensive understanding of the invention can be obtained by referring to the following illustrative examples which are not intended, however, to be unduly limitative of the invention.

Samples of certain of the polymer products produced in the runs described in the examples were examined by infrared analysis. This work was carried out in order to determine the percentage of the polymer formed by cis 1,4-addition, trans 1,4-addition and 1,2-addition of the butadiene. The procedure described hereinafter was employed in making these determinations.

The polymer samples were dissolved in carbon disulfide to form a solution having 25 grams of polymer per liter of solution. The infrared spectrum of each of the solutions (percent transmission) was then determined in a commercial infrared spectrometer.

The percent of the total unsaturation present as trans 1,4- was calculated according to the following equation and consistent units: $\epsilon = E/tc$ where $\epsilon$ = extinction coefficient (liters-mols$^{-1}$-centimeters$^{-1}$); $E$ = extinction (log $I_0/I$); $t$ = path length (centimeters); and $c$ = concentration (mols double bond/liter). The extinction was determined at the 10.35 micron band and the extinction coefficient was 146 (liter-mols$^{-1}$-centimeters$^{-1}$).

The percent of the total unsaturation as 1,2- (or vinyl) was calculated according to the above equation, using the 11.0 micron band and an extinction coefficient of 209 (liters-mols$^{-1}$-centimeters$^{-1}$).

The percent of the total unsaturation present as cis 1,4- was obtained by subtracting the trans 1,4- and 1,2-(vinyl) determined according to the above procedures, from the theoretical unsaturation, assuming one double bond per each $C_4$ unit in the polymer.

EXAMPLE I

A series of polymerization runs was carried out in which 1,3-butadiene was polymerized by means of a catalyst system consisting of triisobutylaluminum, titanium tetrachloride, and iodine. Two runs were also carried out in which the iodine was omitted from the catalyst system. The polymerization recipe was as follows:

| | Parts by wt. |
|---|---|
| 1,3-butadiene | 100 |
| Toluene | 866 |
| Triisobutylaluminum (TBA) | Variable |
| Titanium tetrachloride (TTC) | Variable |
| Iodine (I$_2$) | Variable |
| TTC:I$_2$, mol ratio | 1:1 |
| Catalyst age @ 30° C., minutes | 3 |
| Temperature, ° C. | 5 |
| Time, hours | 17.7–18.7 |

Polymerization was effected in 7-ounce bottles. Toluene was charged first after which each bottle was purged with nitrogen at the rate of 3 liters per minute, the purge time being 2 minutes per 100 cc. of toluene. Triisobutylaluminum was then charged followed by a mixture of titanium tetrachloride and iodine, and finally butadiene. Charging was done at 30° C., after which the bottles were placed in a 5° C. bath and tumbled throughout the polymerization period. The bottles were removed from the bath and to each was added 5 cc. of an antioxidant solution prepared from 200 cc. of isopropyl alcohol, 2 liters of toluene, and 100 grams of phenyl-beta-naphthylamine. The contents of each bottle, after thorough mixing with the antioxidant solution, was poured into approximately 1 liter of isopropanol and the mixture was stirred vigorously. The polymer which precipitated was separate and dried overnight in a vacuum oven. Results of the several runs are shown in Table I.

Infrared analysis on products from runs 3 and 5 gave the following results:

| Run | Trans, percent | Vinyl, percent | Cis, percent |
|---|---|---|---|
| 3 | 1.5 | 3.3 | 95.2 |
| 5 | 3.1 | 3.4 | 93.3 |

From a consideration of the foregoing data, it is seen that the polybutadiene prepared with the catalyst system of this invention contained in excess of 93 percent cis 1,4-addition. In control runs 7 and 8, the iodine was omitted from the catalyst, the amount of the other catalyst components being about the same as that used in runs 3 and 5. It will be noted that in runs 7 and 8 only a trace of polymer was obtained.

EXAMPLE II

A run was carried out in which 1,3-butadiene was polymerized in the presence of a catalyst consisting of triisobutylaluminum, titanium tetrachloride and iodine. The recipe used in this run was as follows:

| | Parts by wt. |
|---|---|
| Butadiene | 100 |
| Toluene | 866 |
| Triisobutylaluminum (TBA) | [1] 0.50 |
| Titanium tetrachloride (TTC) | [2] 0.08 |
| Iodine | 0.227 |
| TBA:TTC mol ratio | 6.25:1 |
| TTC:Iodine mol ratio | 1:2.23 |
| Catalyst age @ 30° C., minutes | 3 |
| Temperature, ° C. | 5 |
| Time, hours | 53.1 |

[1] 2.50 mmoles.
[2] 0.400 mmole.

The procedure followed in this run was the same as that described in Example I. The conversion reached 100 percent, and the product was gel free and had an inherent viscosity of 3.45. Infrared examination revealed that the trans-content was 2.3 percent, the vinyl content was 3.4 percent, and the cis-content was 94.3 percent.

A control run was also carried out under similar conditions in which the iodine was omitted from the catalyst system. In this run a conversion of 2 percent was obtained.

EXAMPLE III

A series of runs was conducted in which 1,3-butadiene was polymerized in the presence of triisobutylaluminum, titanium tetrachloride and iodine. A solution of the

*Table I*

| Run No. | 1 | 2 | 3 | 4 | 5 [1] | 6 | 7 | 8 |
|---|---|---|---|---|---|---|---|---|
| Triisobutylaluminum: | | | | | | | | |
| Parts | 0.60 | 0.50 | 0.40 | 0.40 | 0.50 | 0.50 | 0.40 | 0.50 |
| Millimoles | 3.00 | 2.50 | 2.00 | 2.00 | 2.50 | 2.50 | 2.00 | 2.50 |
| Titanium tetrachloride: | | | | | | | | |
| Parts | 0.08 | 0.06 | 0.05 | 0.11 | 0.06 | 0.09 | 0.05 | 0.06 |
| Millimoles | 0.40 | 0.33 | 0.27 | 0.57 | 0.33 | 0.45 | 0.27 | 0.33 |
| Iodine: | | | | | | | | |
| Parts | 0.10 | 0.08 | 0.07 | 0.14 | 0.08 | 0.11 | | |
| Millimoles | 0.40 | 0.33 | 0.27 | 0.57 | 0.33 | 0.45 | | |
| TBA:TTC mol ratio | 7.50:1 | 7.50:1 | 7.50:1 | 3.50:1 | 7.50:1 | 5.55:1 | 7.50:1 | 7.50:1 |
| Conversion, percent | 71 | 69 | 57 | 29 | 55 | 25 | Trace | Trace |
| Inherent Viscosity | 2.08 | 2.92 | 2.96 | 2.43 | 2.54 | 1.88 | | |

[1] A different charging procedure was used in this run. Iodine was added to the triisobutylaluminum and this mixture was charged to the toluene followed by the titanium tetrachloride and finally the butadiene.

catalyst components was prepared in accordance with the following formulation:

| | Parts by weight |
|---|---|
| Toluene | [1] 112.6 |
| Titanium tetrachloride (TTC) | [2] 0.108 |
| Triisobutylaluminum (TBA) | [3] 0.226 |
| Iodine | [4] 0.145 |

[1] 130 ml.
[2] 0.57 mmole.
[3] 1.14 mmoles.
[4] 0.57 mmole.

In preparing the solution of catalyst components, toluene was charged to a 7-ounce beverage bottle followed by a nitrogen purge for 3 minutes at the rate of 3 liters per minute. Titanium tetrachloride was then added followed by triisobutylaluminum, the mixture was shaken, and then iodine was introduced. Aliquot portions of this mixture were employed in a series of runs for the polymerization of butadiene. The recipe was as follows, 0.1 portion being charged to each of the bottles:

| | Parts by weight |
|---|---|
| Butadiene | 100 |
| Toluene | 866 |
| Triisobutylaluminum (TBA) | Variable |
| Titanium tetrachloride (TTC) | [1] 0.166 |
| Iodine | [2] 0.222 |
| Temperature, °C. | 30 |
| Time, hours | 2.5 |

[1] 0.875 mmole.
[2] 0.875 mmole.

Polymerization was effected in 7-ounce bottles. The toluene was charged first followed by a nitrogen purge for 3 minutes at the rate of 3 liters per minute. The bottles were capped, pressured to 20 p.s.i. with nitrogen, and variable amounts of triisobutylaluminum were introduced. A portion of the previously prepared TBA-TTC-$I_2$ solution was charged and then the butadiene. The bottles were placed in a 30° C. bath and tumbled throughout the polymerization period. They were removed from the bath and to each was added 50 ml. of a solution of the antioxidant, [2,2'-methylene-bis(4-methyl - 6 - tert-butylphenol)], which was prepared by dissolving 52 grams of the compound in four liters of toluene and adding 100 ml. of isopropanol. The isopropanol served as a shortstop. The contents of each bottle, after addition and thorough mixing with the antioxidant solution, was poured into approximately one liter of isopropanol and the mixture was stirred vigorously. The polymer which precipitated was separated and dried overnight in a vacuum oven. Results of the several runs are shown in Table II.

Table II

| Run | TBA [1] Parts | TBA [1] Mmoles | TBA:TTC Mole Ratio | Conversion, percent |
|---|---|---|---|---|
| 1 | 1.14 | 5.75 | 6.6:1 | 82 |
| 2 | 0.94 | 4.75 | 5.4:1 | 96 |
| 3 | 0.74 | 3.75 | 4.3:1 | 94 |
| 4 | 0.54 | 2.75 | 3.14:1 | 25 |
| 5 | 0.74 | 3.75 | 4.4:1 | 1 |

[1] This is the total amount charged, i.e., TBA charged at the beginning of the polymerization plus that contained in the TBA-TTC-$I_2$ mixture.

The product from run 3 had an inherent viscosity of 1.78 and was gel free. Infrared analysis of this product showed that it contained 8.4 percent trans 1,4-addition, 3.8 percent 1,2-addition (vinyl) and 87.8 cis 1,4-addition. Control run 5 was similar to run 3 except that the iodine was omitted from the catalyst system. Infrared analysis of the product from run 5 showed that it contained 29 percent trans 1,4-addition, 11 percent 1,2-addition (vinyl) and 60 percent cis 1,4-addition. These data indicate that a high cis polybutadiene is not produced unless iodine is present in the catalyst system.

EXAMPLE IV

Another run was carried out in which 1,3-butadiene was polymerized with a catalyst consisting of triisobutylaluminum, titanium tetrachloride and iodine. The recipe used in this run was as follows:

| | Parts by weight |
|---|---|
| Butadiene | 100 |
| Toluene | 866 |
| Triisobutylaluminum (TBA) | [1] 0.495 |
| Titanium tetrachloride (TTC) | [2] 0.0760 |
| Iodine ($I_2$) | [3] 0.1015 |
| TBA:TTC:$I_2$ mol ratio | 6.25:1:1 |
| Temperature, °C. | 5 |
| Time, hours | 54.5 |
| Conversion, percent | 99 |

[1] 2.50 mmoles.
[2] 0.400 mmole.
[3] 0.400 mmole.

A procedure similar to that described in Example I was employed except that 0.416 part (2.10 millimoles) of triisobutylaluminum was charged initially instead of the total quantity. The remaining triisobutylaluminum (0.079 part or 0.400 millimole) was treated separately with an equimolar quantity of iodine (0.400 millimole). This reaction mixture was charged followed by titanium tetrachloride and butadiene. The polymerization was allowed to proceed for a period of 54.5 hours. The conversion was 99 percent and a high cis-content polymer was obtained.

EXAMPLE V

A series of runs was carried out in which 1,3-butadiene was polymerized in the presence of a catalyst consisting of triisobutylaluminum, titanium trichloride and iodine. The recipe used in these runs was as follows:

| | Parts by weight |
|---|---|
| Butadiene | 100 |
| Toluene | 1200 |
| Triisobutylaluminum (TBA) | Variable |
| Titanium trichloride ($TiCl_3$) [1] | [2] 0.0617 |
| Iodine, mmoles | Variable |
| Catalyst age @ 30° C., minutes | 3 |
| Temperature, °C. | Variable |
| Time, hours | Variable |

[1] Prepared from $TiCl_4$ by a photochemical reduction process.
[2] 0.40 mmole.

The procedure followed in these runs was the same as that used in Example I. The results of the runs are set forth in Table III.

Table III

| Run No. | 1 | 2 | 3 | 4 |
|---|---|---|---|---|
| Triisobutylaluminum: | | | | |
| Parts | 0.397 | 0.595 | 0.992 | 0.397 |
| Mmoles | 2.00 | 3.00 | 5.00 | 2.00 |
| Titanium trichloride: | | | | |
| Parts | 0.0617 | 0.0617 | 0.0617 | 0.0617 |
| Millimoles | 0.40 | 0.40 | 0.40 | 0.40 |
| Iodine: | | | | |
| Parts | 0.1016 | 0.254 | 0.254 | 0 |
| Millimoles | 0.40 | 1.00 | 1.00 | 0 |
| Temperature, °C | 30 | 30 | 30 | 50 |
| Time, hours | 18.5 | 17.3 | 16.75 | 16.75 |
| Conversion, percent | 93 | 85 | 73 | ([1]) |
| Inherent Viscosity | 7.88 | 4.12 | 3.77 | |
| Gel, percent | 22 | Trace | 0 | |

[1] Trace of insoluble polymer.

The polybutadiene product from run 1 was examined by infrared analysis and found to contain 1.1 percent trans 1,4-addition, 3.2 percent 1,2-addition (vinyl), and 95.7 percent cis 1,4-addition. It is noted that when iodine was not used in the catalyst system, as in run 4, only a trace of an insoluble polymer was obtained.

EXAMPLE VI

A series of runs was carried out in which 1,3-butadiene was polymerized in the presence of a catalyst consisting of triisobutylaluminum, titanium dichloride and iodine. The recipe used in these runs was as follows:

| | Parts by weight |
|---|---|
| Butadiene | 100 |
| Toluene | 866 |
| Triisobutylaluminum (TBA) | [1] 0.694 |
| Titanium dichloride ($TiCl_2$) | Variable |
| Iodine ($I_2$) | Variable |
| TBA/$TiCl_2I_2$ mol ratio | Variable |
| Catalyst age @ 30° C. minutes | 10 |
| Temperature, ° C. | 30 |
| Time, hours | 3.5 |

[1] 3.50 mmoles.

A procedure similar to that described in Example I was employed in these runs except that the iodine and titanium dichloride were first mixed and the resulting reaction product was used with the triisobutylaluminum in the polymerizations. In the preparation of this reaction product, 0.6694 gram (5.64 millimoles) of titanium dichloride was weighed into 50 ml. of dry toluene, which had been purged with nitrogen, and 1.4274 grams (5.63 millimoles) of iodine was added. This mixture was placed in a ball mill and heated at 50° C. for 18 hours. During this period the purplish color of the iodine disappeared and the mixture was red in color. The reactor product, designated in the recipe and in the table hereinafter as $TiCl_2I_2$, was separated by filtration. The results of the runs are shown below in Table IV.

*Table IV*

| Run No. | 1 | 2 | 3 | 4 | 5 |
|---|---|---|---|---|---|
| $TiCl_2I_2$: | | | | | |
| Parts | 0.652 | 0.435 | 0.326 | 0.261 | 0.218 |
| Millimoles | 1.75 | 1.168 | 0.875 | 0.700 | 0.584 |
| TBA/$TiCl_2I_2$ mol ratio | 2.00/1 | 3.00/1 | 4.00/1 | 5.00/1 | 6.00/1 |
| Conversion, percent | 100 | 100 | 98 | 82 | 63 |
| Inherent Viscosity | 1.84 | | 1.82 | | 2.25 |

The polymer products from runs 1, 3 and 5 were examined by infrared analysis. The results of these analyses were as follows:

| Run No. | Configuration, percent | | |
|---|---|---|---|
| | Trans | Vinyl | Cis |
| 1 | 5.9 | 3.7 | 90.4 |
| 3 | 3.1 | 3.9 | 93.0 |
| 5 | 1.6 | 3.9 | 94.5 |

EXAMPLE VII

A run was carried out in which 1,3-butadiene was polymerized in the presence of a catalyst consisting of triisobutylaluminum, titanium tetrabromide and iodine. A control run was also made in which the iodine was omitted from the catalyst system. The recipe employed in these runs was as follows:

| | Parts by weight |
|---|---|
| Butadiene | 100 |
| Toluene | 1200 |
| Triisobutylaluminum (TBA) millimoles | 2.5 |
| Titanium tetrabromide ($TiBr_4$) do | 0.5 |
| Iodine ($I_2$) do | 0.5 |
| Temperature, ° C. | 5 |
| Time, hours | 2 |

Except as noted hereinafter, the same procedure described in Example I was employed in these runs. After charging the toluene and purging with nitrogen, the triisobutylaluminum in solution in toluene was added. Thereafter, the bottles were cooled to 5° C. after which the iodine and then the titanium tetrabromide were charged. In the case of run 2, the iodine was omitted from the catalyst system. The results of these runs are shown below in Table V, which also includes the data obtained in the infrared examination of the polybutadiene obtained in run 1. It is to be noted that no polymer was obtained in run 2, the control run in which the iodine was not included in the catalyst system.

*Table V*

| Run No. | 1 | 2 [1] |
|---|---|---|
| Iodine, millimoles | 0.5 | 0.0 |
| Conversion, percent | 40 | 0 |
| Configuration, percent: | | |
| Cis | 89.1 | |
| Trans | 8.1 | |
| Vinyl | 2.8 | |

[1] Control run.

Another run was carried out in which the catalyst used also consisted of triisobutylaluminum, titanium tetrabromide and iodine. The same recipe and the same procedure as described above was used in this run except that the reaction time was 48 hours. The results of this run are shown hereinbelow in Table VI which also includes the infrared analysis data.

*Table VI*

| Run No. | 3 |
|---|---|
| Iodine, millimoles | 0.5 |
| Gel, percent | 0 |
| Inherent Viscosity | 3.60 |
| Conversion, percent | 90 |
| Configuration: | |
| Cis | 93.8 |
| Trans | 3.4 |
| Vinyl | 2.8 |

EXAMPLE VIII

A run was conducted in which 1,3-butadiene was polymerized in the presence of a catalyst consisting of triisobutylaluminum, titanium tetrachloride and bromine. The following recipe was use in this run:

| | |
|---|---|
| Butadiene, parts by weight | 100 |
| Toluene, parts by weight | 866 |
| Triisobutylaluminum (TBA) mmoles | 4 |
| Titanium tetrachloride ($TiCl_4$) mmoles | 0.4 |
| Bromine, mmoles | 2.0 |
| Temperature, ° F. | 41 |
| Time, hours | 51 |

The procedure as described in Example I was followed in this run. A conversion of 13 percent was obtained, and an infrared analysis of the product gave the following results:

Configuration, percent
| | |
|---|---|
| Cis | 50.4 |
| Trans | 47.3 |
| Vinyl | 2.3 |

It is seen from the foregoing data that when iodine is replaced by bromine in the catalyst system, the cis-polybutadiene product of this invention is not obtained.

As will be evident to those skilled in the art, many variations and modifications of this invention can be practiced in view of the foregoing disclosure. Such variations and modifications are clearly believed to come within the spirit and scope of the invention.

I claim:

1. A method for polymerizing 1,3-butadiene which comprises contacting 1,3-butadiene with a catalyst which forms on mixing components comprising (a) an organometal compound having the formula $R_3Al$, wherein R is an alkyl radical containing from 1 to 12, inclusive, carbon atoms, (b) a titanium halide having the formula $TiX_m$, wherein X is selected from the group consisting of chlorine and bromine and $m$ is an integer from 2 to 3, inclusive, and (c) iodine, the mol ratio of said organometal compound to said titanium halide being in the range of 2:1 to 20:1 and the mol ratio of said titanium halide to said iodine being in the range of 10:1 to 0.25:1, the mol ratio of said organometal compound to the total molar quantities of said titanium halide and said iodine being greater than 1, said contacting occurring in the presence of a hydrocarbon diluent at a temperature in the range of −100 to 250° F. and at a pressure sufficient to maintain said diluent in liquid phase; and recovering the polymer so produced.

2. A method according to claim 1 wherein said catalyst consists essentially of triisobutylaluminum, titanium trichloride and iodine.

3. A method according to claim 1 wherein said catalyst consists essentially of triisobutylaluminum, titanium dichloride and iodine.

4. The method according to claim 1 wherein the mol ratio of said organometal compound to said titanium halide is in the range of 3:1 to 8:1 and the mol ratio of said titanium halide to said iodine is in the range of 3:1 to 0.25:1.

5. The method according to claim 1 wherein said contacting occurs at a temperature in the range of −30 to 160° F.

6. A method for producing a rubbery polymer of 1,3-butadiene containing a high percentage of cis 1,4-addition which comprises contacting said 1,3-butadiene with a catalyst which forms on mixing components consisting essentially of triisobutylaluminum, titanium trichloride and iodine, said contacting occurring in the presence of a hydrocarbon diluent under autogenous pressure and at a temperature in the range of −30 to 160° F., the mol ratio of said triisobutylaluminum to said titanium trichloride being in the range of 3:1 to 8:1 and the mol ratio of said titanium trichloride to said iodine being in the range of 3:1 to 0.25:1 with the mol ratio of said triisobutylaluminum to the total molar quantities of said titanium trichloride and said iodine being greater than 1; and recovering the rubbery polymer so produced.

7. A method for producing a rubbery polymer of 1,3-butadiene containing a high percentage of cis 1,4-addition which comprises contacting said 1,3-butadiene with a catalyst which forms on mixing components consisting essentially of triisobutylaluminum, titanium dichloride and iodine, said contacting occurring in the presence of a hydrocarbon diluent under autogenous pressure and at a temperature in the range of −30 to 160° F., the mol ratio of said triisobutylaluminum to said titanium dichloride being in the range of 2:1 to 8:1 and the mol ratio of said titanium dichloride to said iodine being in the range of 3:1 to 0.25:1 with the mol ratio of said triisobutylaluminum to the total molar quantities of said titanium dichloride and said iodine being greater than 1; and recovering the rubbery polymer so produced.

8. A catalyst composition prepared by mixing (a) an organometal compound having the formula $R_3Al$, wherein R is an alkyl radical containing from 1 to 12, inclusive, carbon atoms, (b) a titanium halide having the formula $TiX_m$, wherein X is selected from the group consisting of chlorine and bromine and $m$ is an integer from 2 to 3, inclusive, and (c) iodine, the mole ratio of said organometal compound to said titanium halide being in the range of 2:1 to 20:1 and the mol ratio of said titanium halide to said iodine being in the range of 10:1 to 0.25:1, and the mol ratio of said organometal compound to the total molar quantities of said titanium halide and said iodine being greater than 1.

9. A catalyst composition according to claim 8 in which said organometal compound is triisobutylaluminum and said titanium halide is titanium dichloride.

10. A catalyst composition according to claim 8 in which said organometal compound is triisobutylaluminum and said titanium halide is titanium trichloride.

References Cited by the Examiner

UNITED STATES PATENTS 2,910,461  10/1959  Nowlin et al. _____ 260—94.9

FOREIGN PATENTS 543,292  6/1956  Belgium.

JOSEPH L. SCHOFER, Primary Examiner.

MARK LIEBERMAN, LESLIE H. GASTON,
Examiners.